(12) United States Patent
Tam et al.

(10) Patent No.: US 7,065,884 B2
(45) Date of Patent: Jun. 27, 2006

(54) POWER HAND TOOL FOOT ASSEMBLY

(75) Inventors: Ramon Tam, Chicago, IL (US); Jaime Moreno, Wheeling, IL (US); Christopher Weiland, Glenview, IL (US); Lee Eckert, Buffalo Grove, IL (US); Robert Pelisek, Hoffman Estates, IL (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 10/376,159

(22) Filed: Feb. 28, 2003

(65) Prior Publication Data

US 2004/0168561 A1    Sep. 2, 2004

(51) Int. Cl.
*B23D 49/10* (2006.01)

(52) U.S. Cl. .............................. 30/376; 30/392
(58) Field of Classification Search ........... 83/747; 30/373–377, 392–394
See application file for complete search history.

(56) References Cited

U.S. PATENT DOCUMENTS

| | | | |
|---|---|---|---|
| 3,087,519 A * | 4/1963 | McCarty et al. | 30/376 |
| 3,353,573 A | 11/1967 | Hitzeroth | |
| 4,614,037 A | 9/1986 | Somers | |
| 4,693,009 A | 9/1987 | Bone | |
| 5,617,638 A * | 4/1997 | Amano et al. | 30/376 |
| 5,727,322 A | 3/1998 | Giacometti | |
| 5,819,421 A | 10/1998 | Giacometti et al. | |
| 6,189,217 B1 | 2/2001 | Melvin et al. | |
| 6,230,411 B1 * | 5/2001 | Wall et al. | 30/376 |
| 6,357,124 B1 * | 3/2002 | Wall et al. | 30/376 |
| 6,370,781 B1 | 4/2002 | Sasaki | |
| 6,553,675 B1 * | 4/2003 | Orrico | 30/376 |

FOREIGN PATENT DOCUMENTS

| | | |
|---|---|---|
| GB | 2 337 228 | 11/1999 |
| JP | 7-60538 | * 3/1995 |

* cited by examiner

Primary Examiner—Kenneth E. Peterson
(74) Attorney, Agent, or Firm—Greer, Burns & Crain, Ltd.

(57) ABSTRACT

A power hand tool foot assembly includes a platform having an arch portion. A swivel lock is within the arch portion, with a mount connecting the swivel lock to the tool housing. A lever is pivotally mounted on the mount. When the lever is in a locked position, the swivel lock and platform are locked in place. When the lever is in an open position, the longitudinal and angular position of the platform and swivel lock may be adjusted.

14 Claims, 10 Drawing Sheets

POWER HAND TOOL FOOT ASSEMBLY

FIELD OF THE INVENTION

The present invention is related to power hand tools, as well as to foot assemblies for such power hand tools.

BACKGROUND OF THE INVENTION

Electric power hand tools such as portable electric jigsaws and the like are known in the art. Generally, they include an electric motor for driving a shaft, with a tool such as a saw blade attached to the shaft. The electric motor is often an AC, DC or a universal motor, and is contained in a housing. In the case of a jigsaw as well as other cutting tools, a so-called foot may be provided connected to the base of the tool housing that includes a generally flat platform for engaging a workpiece surface. The foot allows the power tool to move over the workpiece surface to achieve an accurate and desired result.

Some jigsaws and other power tools may feature a foot assembly that has a foot that is tiltably connected to the tool housing. By tilting the foot, the tool blade is able to address a workpiece at an angle to achieve a beveled cut. By way of example, by tilting the foot to a 45° angle to a jigsaw housing, the jigsaw blade is able to cut an underlying workpiece at a 45° angle. Although tiltable power tool feet are generally known, problems with them remain. For example, mechanisms for locking the foot at a desired angle to the tool housing are often burdensome to use. Often a screwdriver, wrench, or the like is required to tighten one or more threaded locking members such as bolts. Tightening and loosening of the locking member requires time and effort. Also, the screwdriver, wrench, or other tool must be carried about with the saw. Sawdust and other debris created by the jigsaw can also combine with saw lubricants to foul the threaded locking member.

Solutions to these and other problems have been proposed. For example, it has been proposed to use a locking lever to lock the foot in place at a desired orientation to the tool housing. To date, however, the locking levers used have been relatively costly to manufacture and cumbersome to install and adjust. Further, known hand operating levers may offer less frictional holding strength than do tool tightened threaded bolts and the like. The substantial vibration developed during operation of a jigsaw can result in the foot slipping and changing orientation angle when locked with known levers.

Solutions to movement of the foot have also been proposed. For example, it is known to provide an angle guide consisting of notches cut into an edge of an arched portion of the foot that connects the platform to the housing. The notches can be engaged by a locking formation such as a stud on the housing once a desired orientation is reached. Such configurations have met only limited success, however. Vibration of the tool may result in the locking formation disengaging from the notch. Vibration may also cause the foot to disengage from the stud when it separates vertically from the tool over the top of the stud.

These and other problems remain unresolved in the art.

SUMMARY OF THE INVENTION

One exemplary embodiment of the present invention is directed to a power tool foot assembly that includes a platform having an arch portion with at least one opening, and a swivel lock with at least one opening. A mount passes through the arch portion opening, through the swivel lock opening and is connected to the tool housing. A lever is pivotally held on the mount, and is configured to lock the platform in place.

An additional invention embodiment is directed to a level adjustable power tool foot assembly for a power tool of the type that has a housing with a locking extension. This exemplary foot assembly includes a platform adjustably attached to the housing and configured to travel in a lengthwise direction of the tool and rotate relative to a lengthwise or longitudinally oriented axis. A substantially planar angle guide is connected to the platform and has a plurality of guide openings that are selectively engageable with a tool locking extension.

Still another invention embodiment is directed to an electric jigsaw having a reciprocating blade linked to an electric motor contained in a housing. A foot assembly platform is adjustably attached to the housing, and has a blade engaging roller that is selectively movable into engagement with the blade.

DETAILED DESCRIPTION

Figure 1:
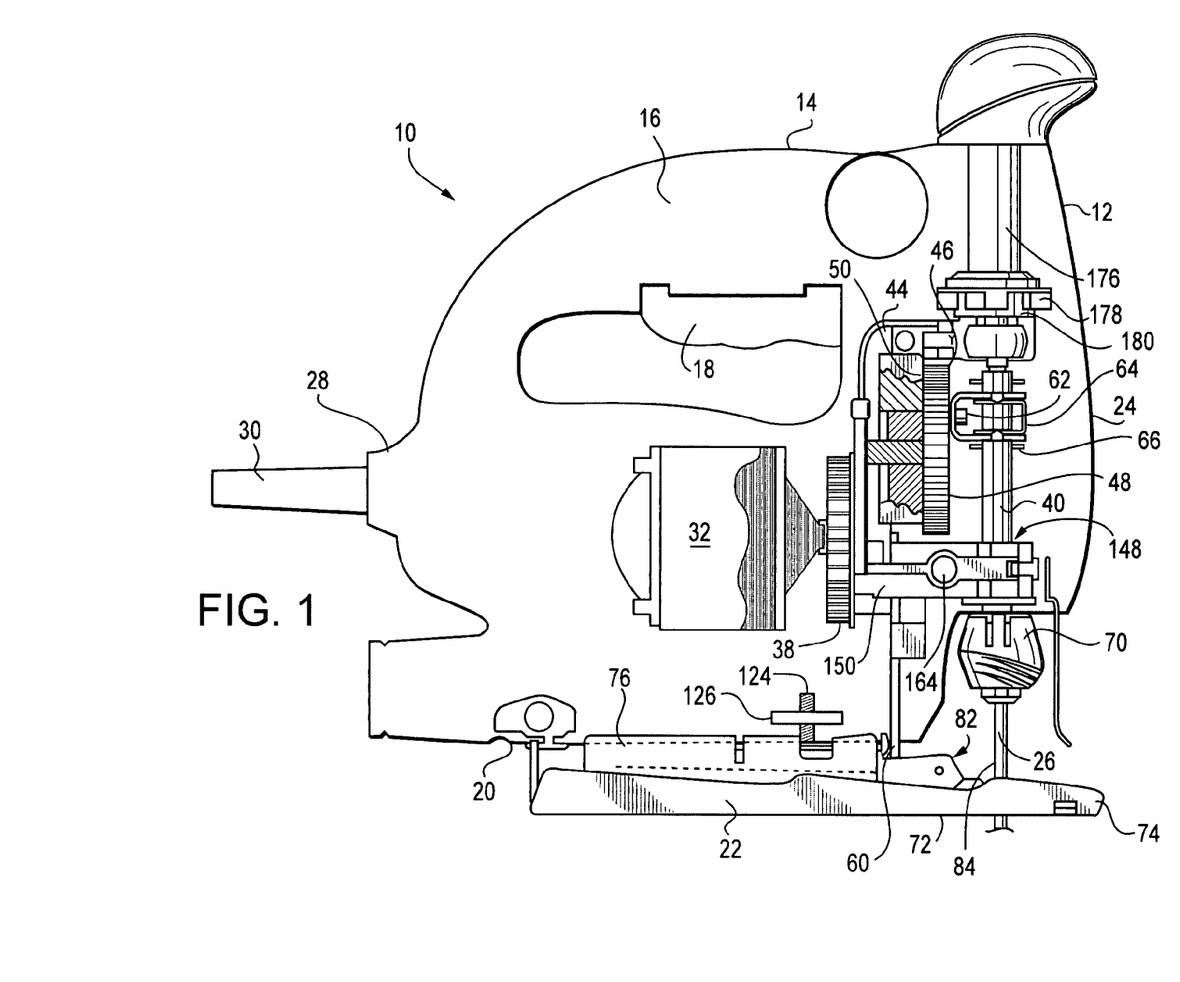
FIG. 1 is a perspective view of a jigsaw including an exemplary foot assembly embodiment of the invention.

Turning now to the drawings, FIG. 1 shows a jigsaw generally at 10 that includes a housing 12. A motor such as an AC, a DC, or a universal motor is contained in the housing 12, and is linked to a reciprocating saw blade 14. An on/off switch 16 controls the motor. Power is supplied to the motor using the cord 17, while a battery or other portable source maybe used to power a DC or universal motor. Those knowledgeable in the art will appreciate that these components of jigsaws are generally known, and accordingly need not be discussed in detail herein. The preferred jigsaw 10 also includes a scroll controller 18 for turning the blade 14 relative to the housing 12 to perform scroll cutting.

The jigsaw 10 also has a foot assembly shown generally at 20 that includes a platform 22 that lies along a generally flat plane for traveling over a workpiece. As shown by FIGS. 2, 5, 6 and 7, a generally curved arch portion 24 rises from the platform 22. The arch portion 24 has a T-shaped opening 28 in the top thereof that facilitates attachment of the foot assembly 20 to the jigsaw 10 (see FIG. 2), and also has a transversely oriented slot 30 extending along a portion of a perimeter of the arched portion 24. The arched portion 24 terminates at a front edge 32.

A swivel lock shown generally at 34 is contained in the arch portion 24. The swivel lock 34 has a slot 36 through which a mount shown generally at 38 in FIGS. 4, 6 and 7 extends. The mount 38 further extends through the opening 28 of the arch portion 24, and is removably attached to the housing 12. The mount 38 preferably includes a threaded bolt 40 that is removably attached to the tool housing 12 by threaded engagement with a nut 42 contained in the housing 12. A removable yoke 44 is held on the bolt 40. As shown by FIGS. 6, 7, 8 and 9, the bolt 40 passes through a yoke bore 46, with the yoke 44 removably held in place by an enlarged head 48 of the bolt 40.

Figure 3:
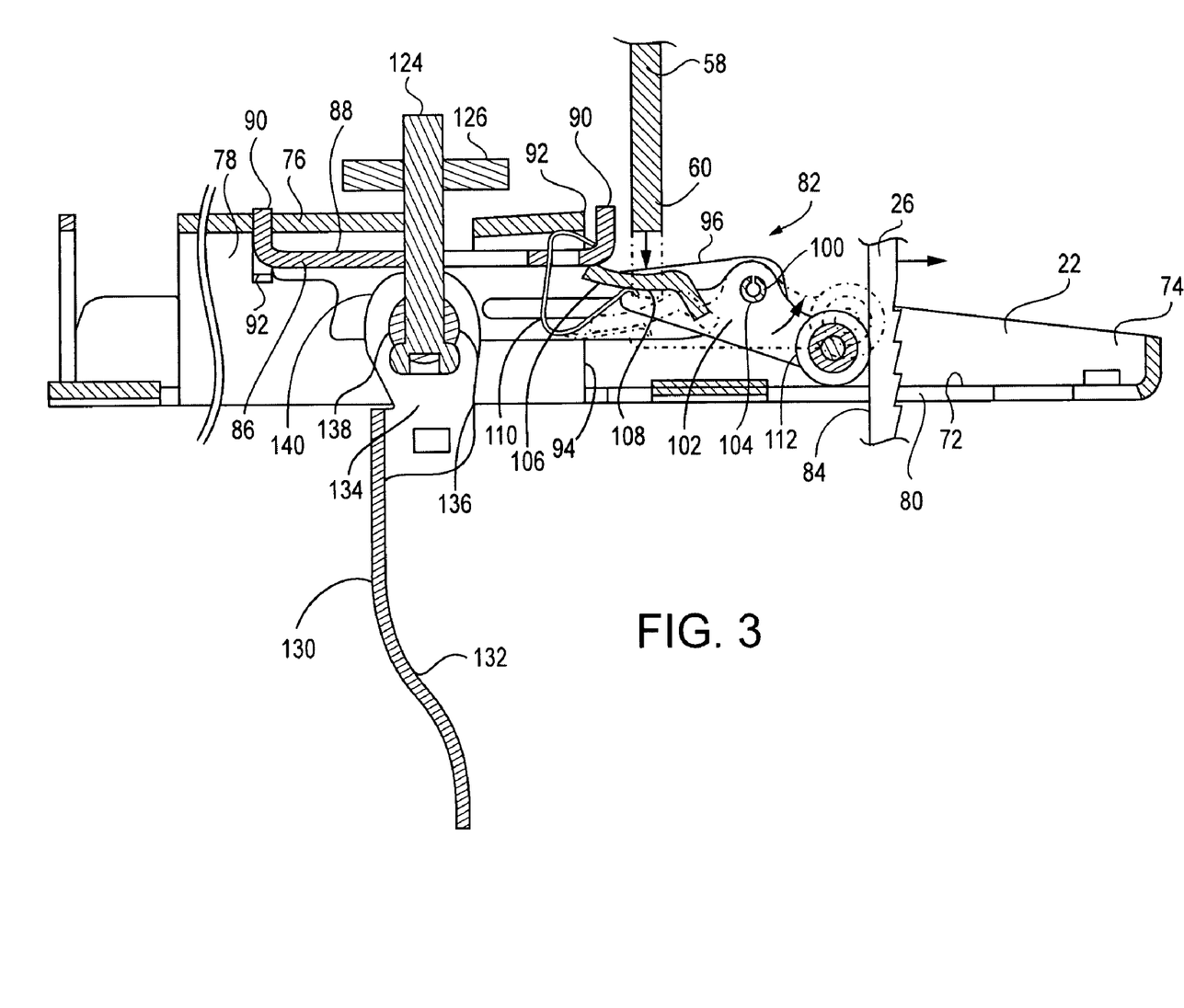
FIG. 3 is perspective view of the swivel lock of the foot assembly of FIG. 2.
Figure 4:
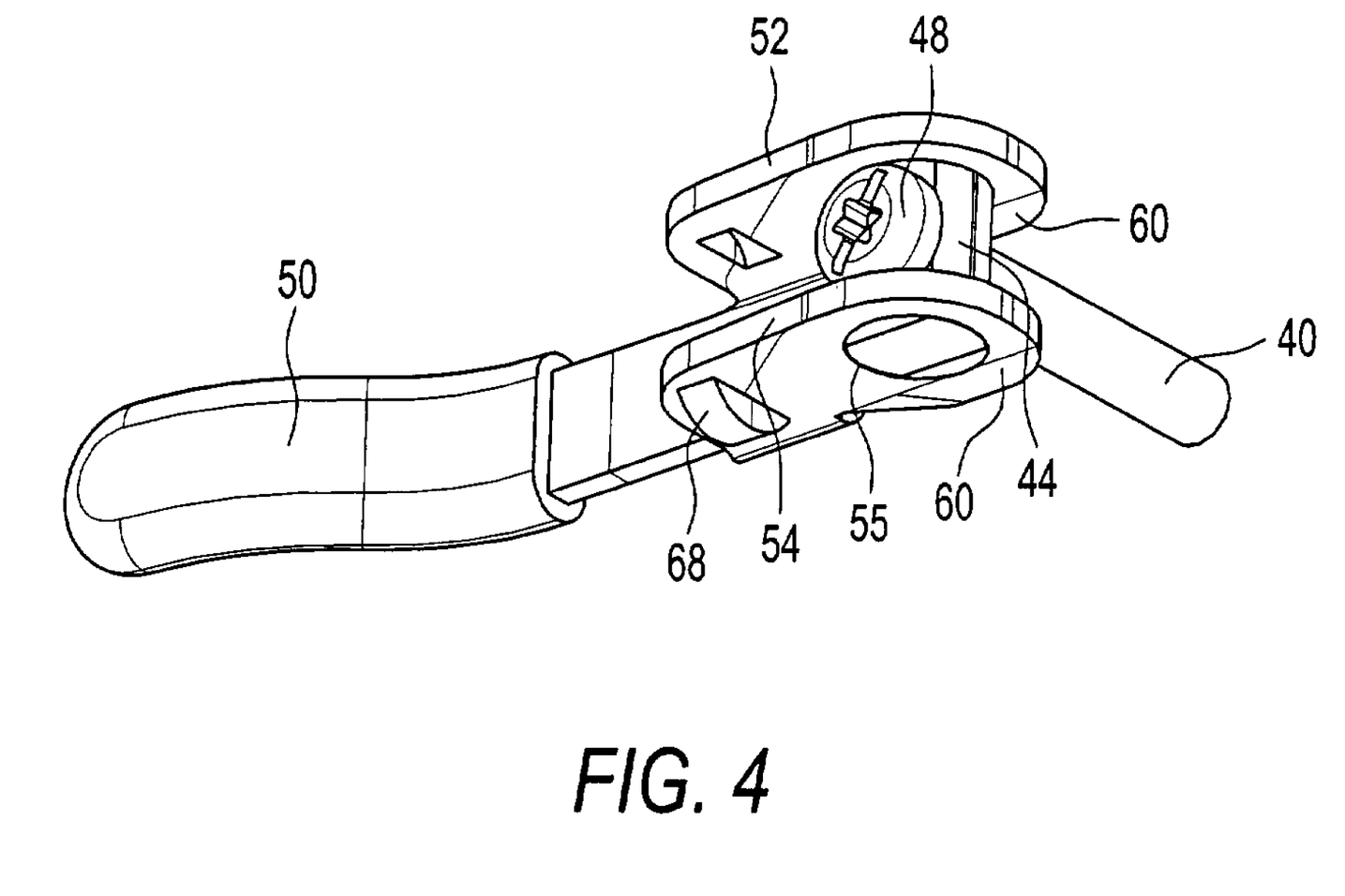
FIG. 4 is a perspective view of the mount and lever of the foot assembly of FIG. 2.
Figure 5:
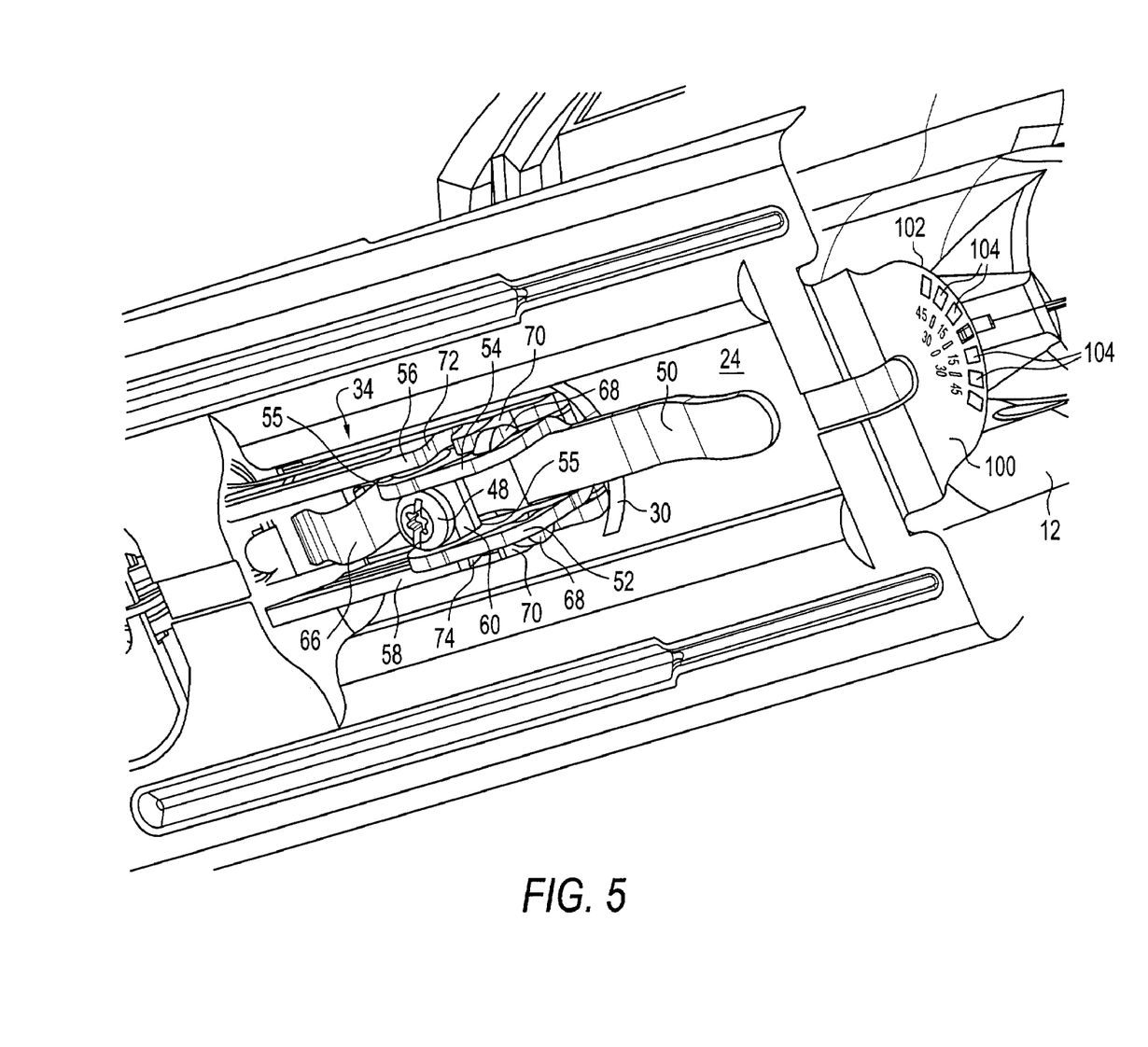
FIG. 5 is a perspective view of the foot assembly of FIG. 2 with the lever in a locked position.

As shown by FIGS. 4, 6, 7, 8 and 9, a lever 50 is pivotally connected to the mount 38, with a pair of lever sidewalls 52 and 54 each having a generally circular hole 55 for rotatably receiving the yoke 44. After installation, the yoke 44 is held in engagement with the lever sidewall holes 55 by the restraint of the swivel lock sidewalls 56 and 58 between which they sit as best shown by FIGS. 3 and 5. The lever 50 further includes an eccentric cam 60 that is defined by the edges of the sidewalls 52 and 54.

The configuration of the preferred mount 38 has been discovered to offer several advantages. Use of commodity items such as the bolt 40, nut 42, and yoke 44, for example, provides for substantially reduced cost over configurations that use specially made or otherwise less readily available components such as a cross member permanently attached to a stud. Also, the mount 38 provides for relatively easy installation and for easy adjustment by tightening of the bolt 40 as may be required for instance over time as the cam 60 wears. Those knowledgeable in the art will appreciate additional benefits and advantages provided by the preferred mount 38.

Figure 8:
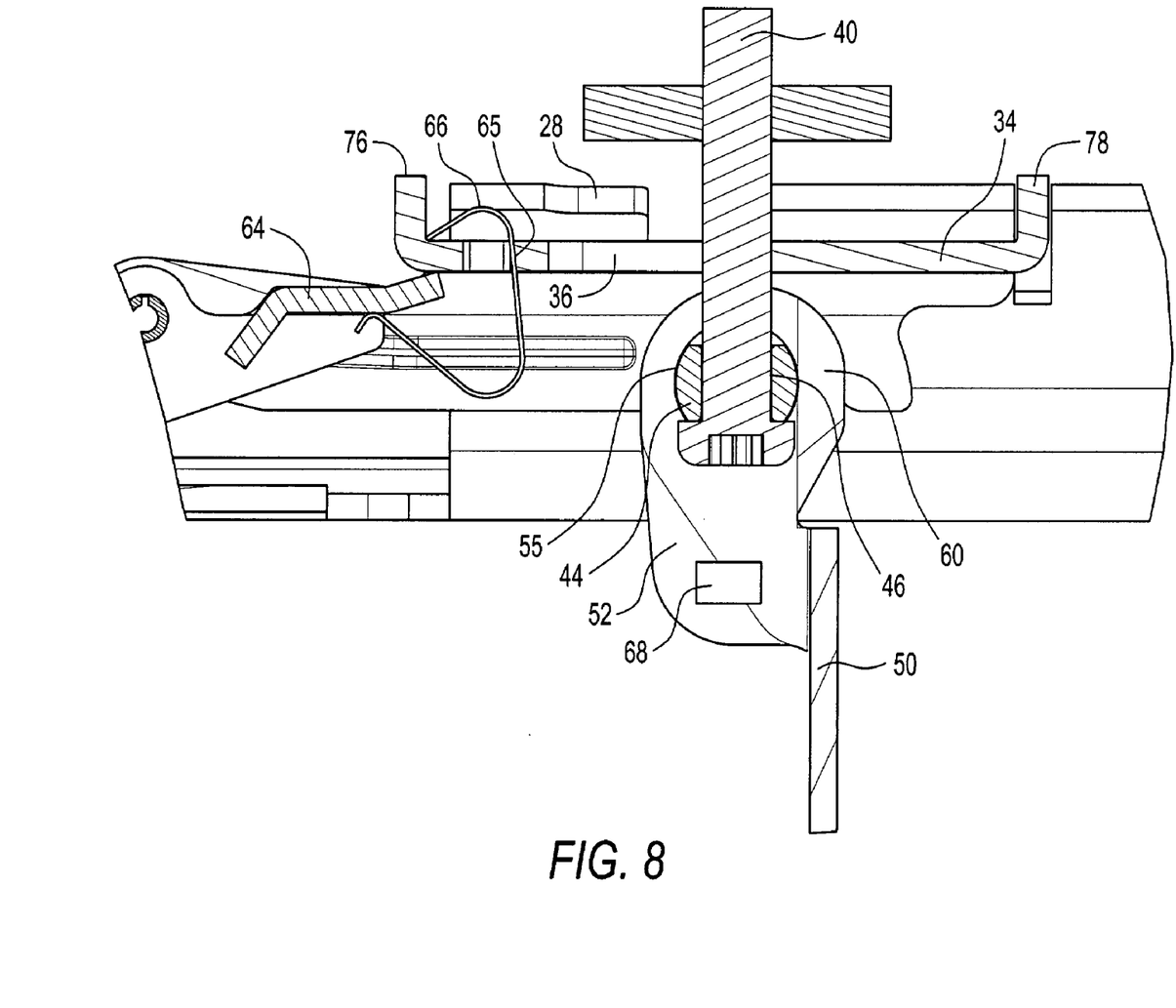
FIG. 8 is an enlarged portion of the cross-section of FIG. 7.
Figure 9:
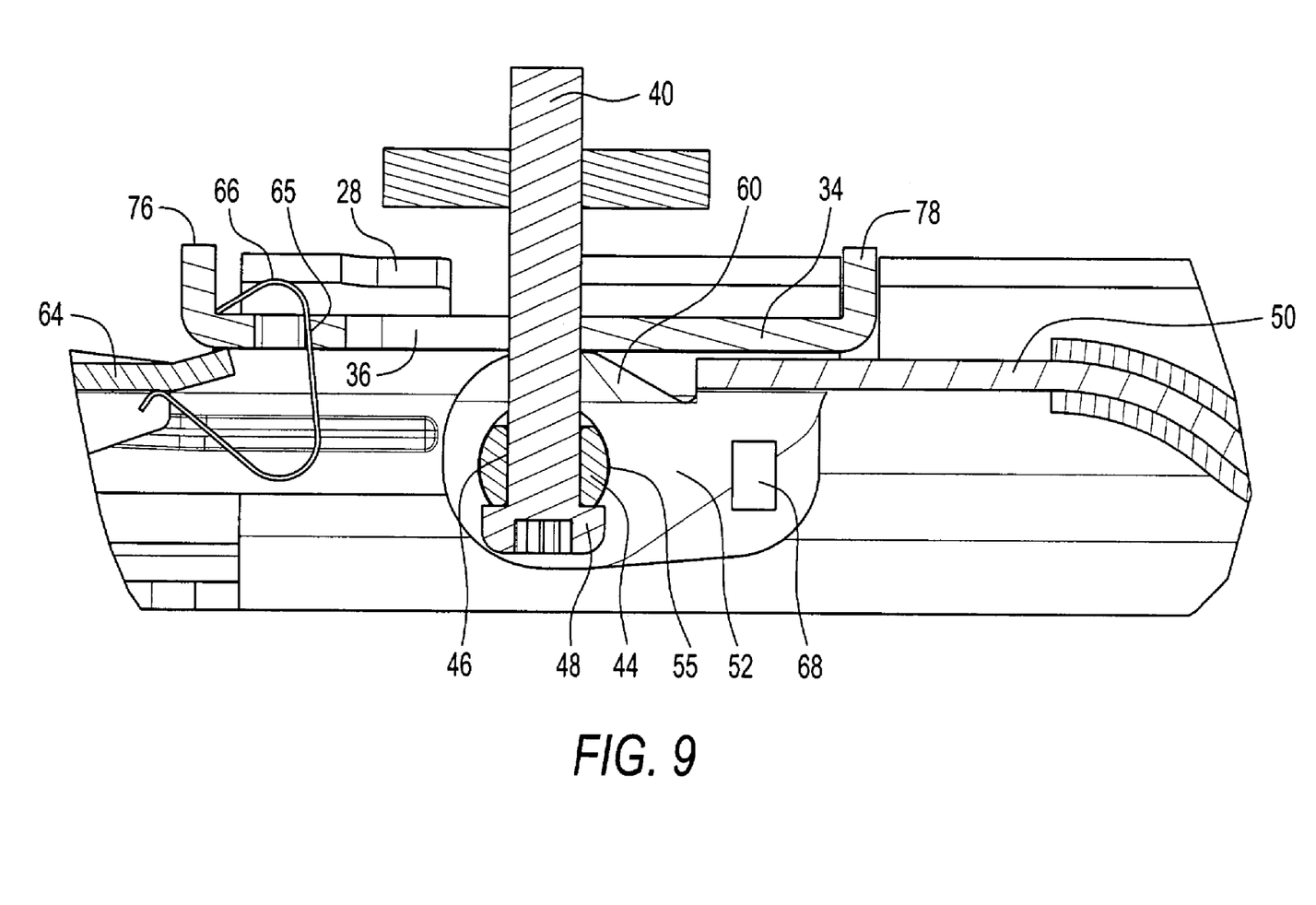
FIG. 9 is an enlarged portion of the cross-section of FIG. 6.

In combination with the mount 38, the lever 50 is operable to lock the swivel lock 34 and the platform 22 in either a forward or rearward position relative to the jigsaw housing 12, and to lock the platform 22 and arch portion 24 at a desired angle of tilt to the housing 12. FIGS. 8 and 9 are useful to illustrate the locking action of the lever 50. In FIG. 8, the lever 50 is in an unlocked position with a gap 61 spacing the eccentric cam 60 from the swivel lock 34. In this unlocked position the swivel lock 34 and the arch portion 24 are free to move relative to the lever 50 and bolt 40. The T-shaped opening 28 allows for the foot platform 22 and arch portion 24 to be moved both longitudinally and tiltably relative to the housing 12. The swivel lock 34 is capable only of longitudinal movement because of the shape of the slot 36.

FIG. 9 shows the lever 50 in a locked position. In this position, the lever 50 has been pivotally moved to cause the eccentric cam 60 to engage the swivel lock 34. Thus the gap 61 of FIG. 8 no longer exists, and the lever 50 and its cam 60 hold the swivel lock 34 and the arch portion 24 in place relative to the bolt 40 and lever 50. When in a locked position, the lever 50 and swivel lock 34 preferably do not protrude below the bottom plane of the platform 22 regardless of whether it may be in a tilted or level position.

Figure 2A:
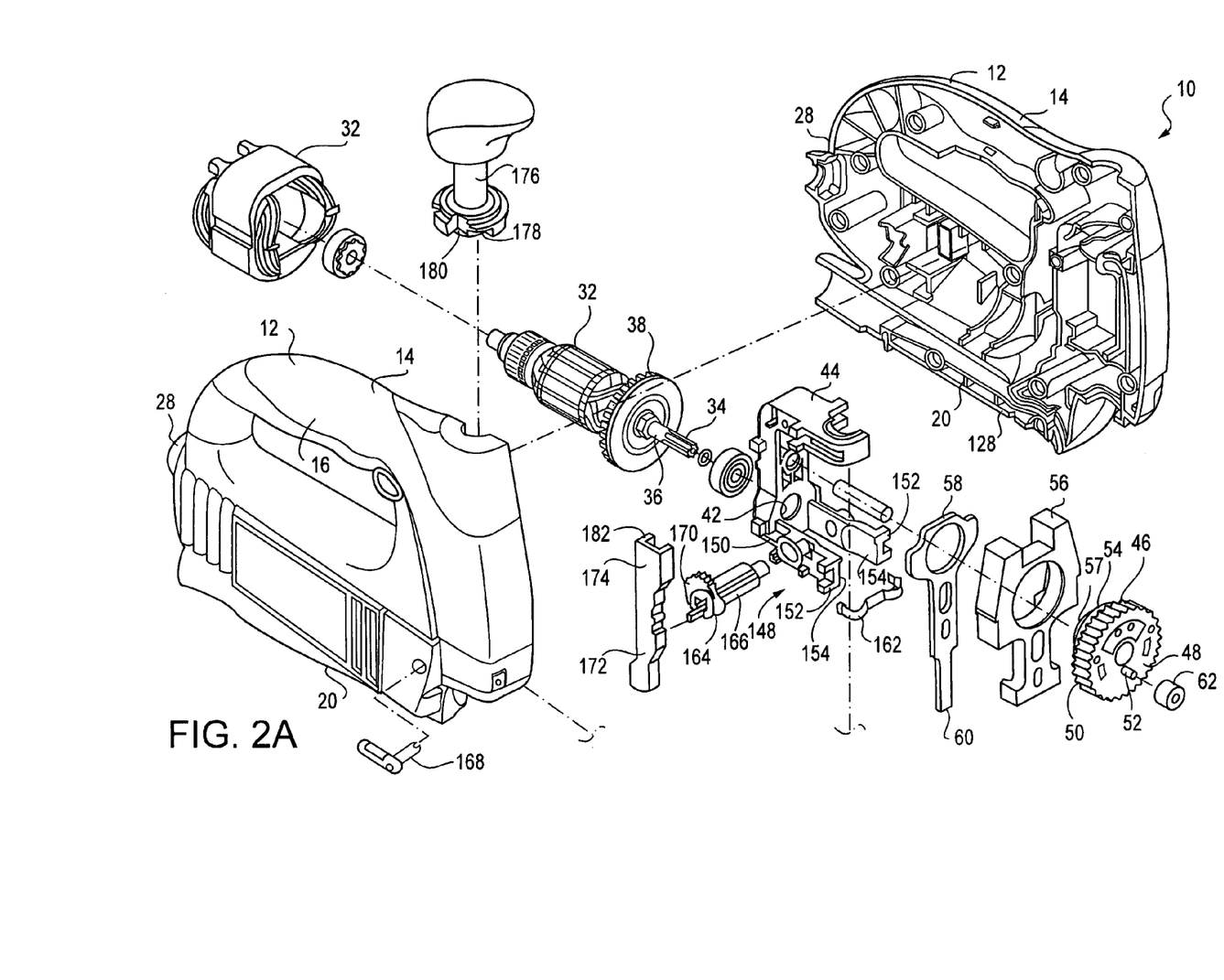
FIG. 2 is a perspective view of the foot assembly embodiment of FIG. 1 removed from the jigsaw.
Figure 2B:
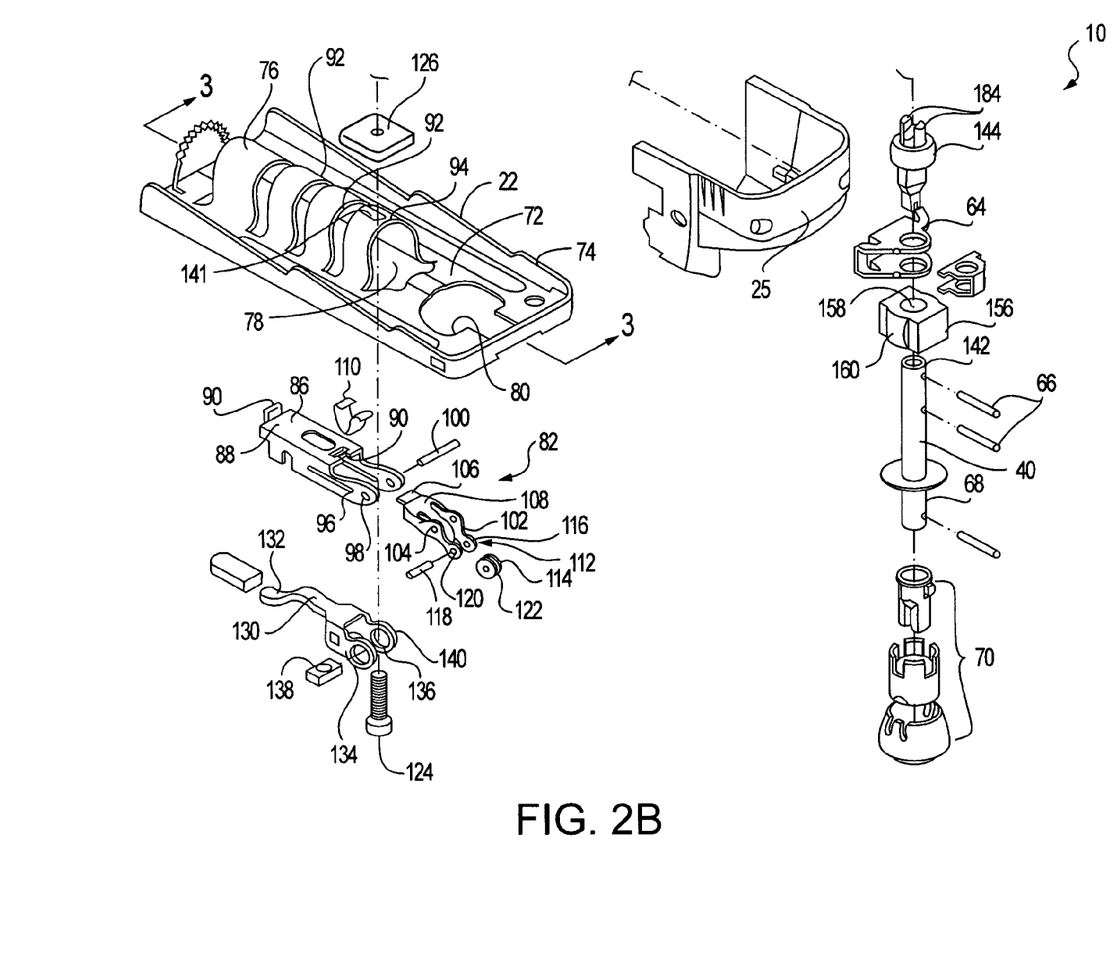

Referring in particular to FIG. 2, lengthwise travel of the platform 22 and arch portion 24 occur when the arch portion 24 is moved to pass the bolt 40 along the stem portion 59 of the T-shaped opening 28, and rotational or tilting movement as the arch portion 24 is moved to pass the bolt 40 along the width of a cross portion 61 of the T-shaped opening 28. The width of the cross portion 61 in the longitudinal direction of the tool is larger than the diameter of the bolt 40 to allow for some longitudinal movement of the platform 22 when it is tilted relative to the housing 12. The length in the transverse dimension of the cross portion 61 is preferably sufficient to achieve at least a 45° angle of orientation of the platform 22 in each direction relative to the housing 12. The distance between the forward and rearward positions of the platform 22 depends on the length of the swivel lock slot passage 36 and the length of the stem portion 59 of the T-shaped opening 28.

Figure 6:
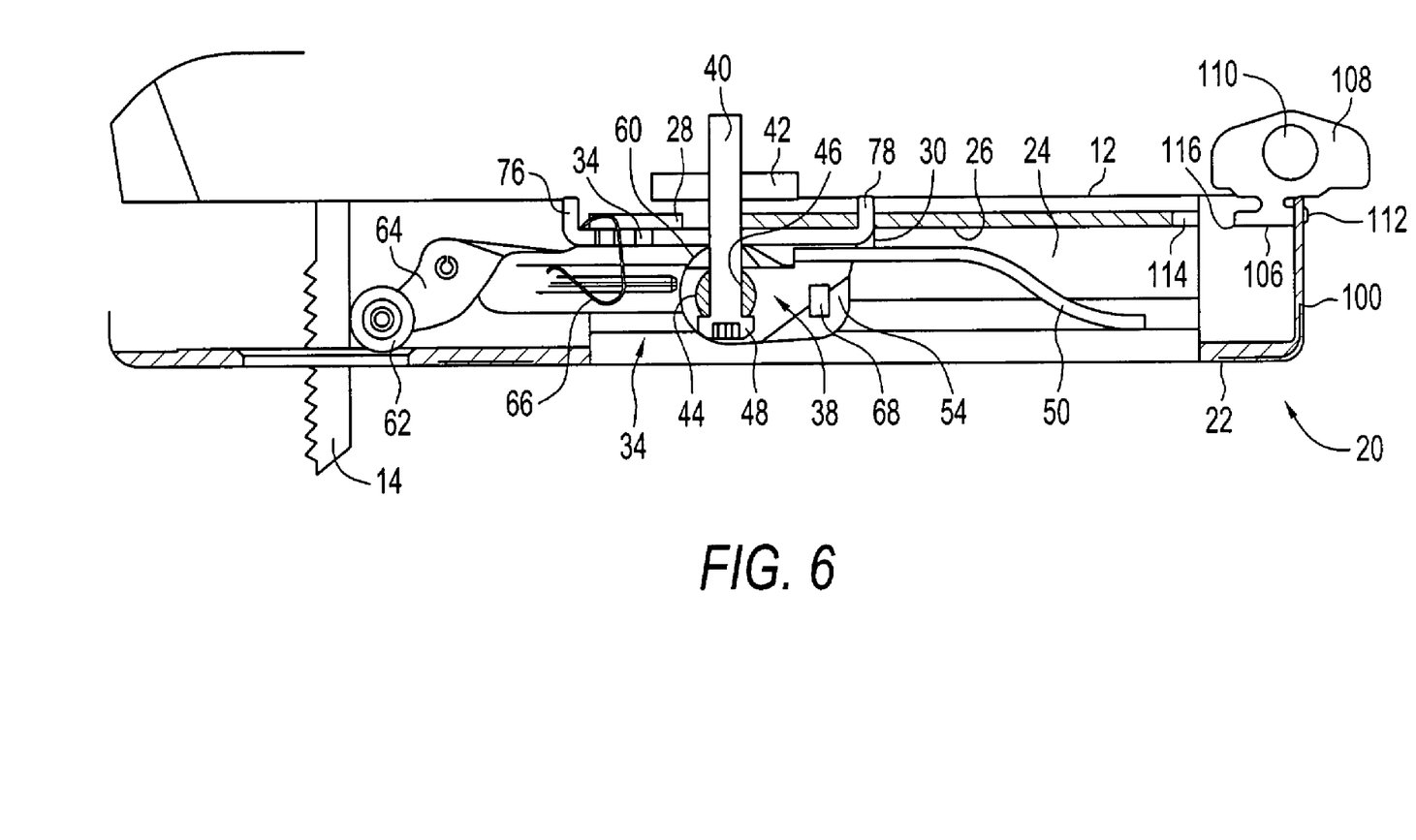
FIG. 6 is a cross-section of the foot of FIG. 2 taken generally along the line 6—6 thereof, with the lever in an unlocked position.
Figure 7:
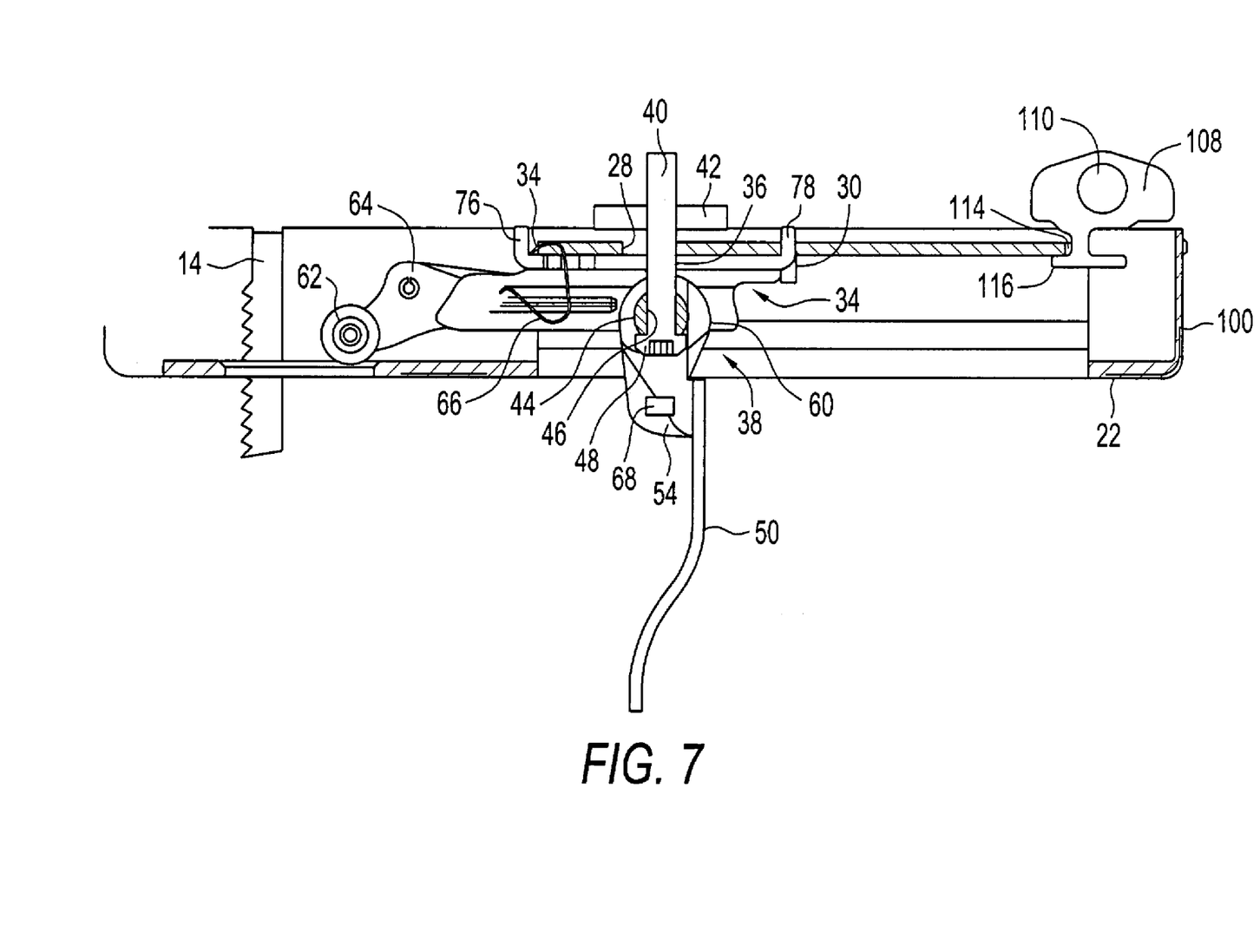
FIG. 7 is the cross-section of FIG. 6 with the lever in an unlocked position.

Practice of the invention is contemplated without a swivel lock 34, in which case the lever's eccentric cam 60 would directly engage the arch portion 24. Use of a movable swivel lock 34 is preferred, however. One advantage of the preferred movable swivel lock 34 is its ability to permit the jigsaw 10 to have an orbital blade movement mechanism that can be selectively engaged and disengaged. Such a mechanism is shown to have a blade-engaging roller 62 for engaging the blade 14. When the swivel lock 34 is in a forward position, the roller 62 engages the blade 14 as shown in FIG. 6, while when in a rear position the roller 62 is disengaged from the blade 14 as shown in FIG. 7. The swivel lock 34 includes a pivoting roller arm 64 for rotatably holding the roller 62 on one end. A spring clip 66 engages the other end of the roller arm 64 and urges the first end into an upward position. As best illustrated by FIGS. 8 and 9, the spring clip 66 extends through a passage 65 in the swivel lock 34. The spring clip 66 and pivoting roller arm 64 allow the roller 62 to move to accommodate orbital cutting action of the blade 14.

Those skilled in the art will appreciate that selective engagement of the roller 62 with the blade 14 through forward movement of the swivel lock 34 offers advantages. For example, the roller 62 may desirably engage the blade 14 when cutting with the blade oriented straight ahead, but not when the blade is rotated relative to the housing during scrolling.

It has been discovered that when the roller 62 is in engagement with the blade 14, substantial force can be exerted on the swivel lock 34 in a rearward direction (i.e., towards the foot assembly 20). To ensure that the swivel lock 34 and the foot platform 22 remain in place, the preferred lever 50 includes locking formations for abutting the swivel lock 34. Exemplary locking formations include the raised ridges 68 on each of the lever sidewalls 52 and 54, as best shown by FIGS. 4 and 5. The raised ridges 68 are configured to abut the rear edge 70 of each of the sidewalls 52 and 54 when the lever 50 is in a locked position and the swivel lock 34 is in a forward position, as is best shown by FIG. 5, to resist rearward lateral movement of the swivel lock 34. As best shown in FIGS. 3 and 5, the swivel lock sidewalls 56 and 58 also each have a slot 72 and 74, respectively, for receiving the raised ridges 68 when the swivel lock 34 is locked in a rearward position.

The preferred swivel lock 34 also has a pair of restraining arms 76 and 78 to resist longitudinal movement of the swivel lock 34 relative to the arch portion 24. The restraining arms 76 and 78 also provide rotational stability as the arch portion 24 is rotated relative to the swivel lock 34. The restraining arm 76 is configured to engage the front edge 32 of the arch portion 24, while the restraining arm 78 engages the slot 30 in the arch portion 24. The slot 30 preferably extends a distance sufficient to allow the platform 22 to be rotated to at least a 45° angle in each direction relative to the housing 12. The arms 76 and 78 preferably have a length that minimizes frictional contact with the surface of the housing 12 as movement of the swivel lock 34 occurs.

An additional aspect of the jigsaw 10 and the foot assembly 20 of the invention is a substantially planar angle guide 100 as shown in FIGS. 2, 5, 6 and 7. The angle guide 100 preferably has a semi-circular shaped upper perimeter 102, and includes a plurality of openings 104 proximate the perimeter 102. A locking projection 106 extends from the housing 12 for engaging any of the openings 104. The preferred locking projection 106 further includes a base 108 with an opening 110 for secured attachment to the tool housing 12 via use of a bolt, stud, or the like (not shown) internal to the housing 12.

Each of the openings 104 corresponds to an angle of tilt of the platform 22 relative to the housing 12, and is preferably marked with an appropriate angle. The openings 104 may thus be used to select a desired angle for bevel cutting, for instance. When the lever 50 is in an open position, the arch portion 24 and platform 22 may be rotated to a desired angle of tilt, and then moved in a forward direction to engage the locking projection 106. The locking projection 106 preferably has an engaging finger 112 that is sufficiently long so that a portion of the finger extends through a selected one of the openings 104 to ensure good locking engagement. Use of notches as an alternative to the openings 104 is also contemplated. The openings 104 are preferred, however, since they are believed to provide more secure engagement than notches.

The planar angle guide 100 of the present invention has been discovered to provide valuable advantages. For example, known angle guides of the prior art often included notches or slots located along an edge of an elliptically bent metal portion of a foot assembly. As these metal pieces are often fabricated of flat stamped metal that is subsequently bent, accurately locating the notches on the pre-bent metal was cumbersome since the distances between notches would change with bending. Further, a locking projection engaged in one of the notches was prone to disengagement due to vibration or other movement of the foot assembly. The flat angle guide 100 provides an elegant solution to these and other problems. Because it is substantially planar, the angle guide 100 is relatively easy and inexpensive to fabricate. The passages 104 are easy to accurately place since no subsequent bending is required.

The locking projection 106 is also configured to engage an angle guide notch 114 provided on the rear edge of the arch portion 24 when the arch portion is in a rearward position, as illustrated in FIG. 7. The locking notch 114 is preferably oriented so that the platform 22 is at a 90° angle to the housing 12 when engaged by a forward finger 116 of the locking projection 106.

It will be appreciated that although discussion and description has been made herein of a particular tool and housing embodiment, such treatment has been made only to illustrate the invention. Other invention embodiments and equivalents to various features of the invention as described will be apparent to those skilled in the art. Also, in considering the jigsaw 10 and the foot assembly 20, it will be appreciated that exemplary embodiments of the present invention are directed to a tool such as the jigsaw 10, while others are directed only to the foot assembly 20. Indeed, those knowledgeable in the art will appreciate that the foot assembly 20 will provide benefits and advantages when used with power tools other than a jigsaw. Also, it will be appreciated that the substantially planar angle guide 100 of the invention will provide benefits and advantages when used with power hand tools and feet that do not include other elements of the foot assembly of embodiments shown and described herein, such as the mount 38 and lever 50. Likewise, an invention embodiment that includes a foot assembly 20 that is movable in a longitudinal direction and has a roller 62 for selectively engaging a blade 14 will also be advantageous whether or not other elements, such as a planar angle guide or a locking lever, are present.

Various features of the invention are set forth in the attached claims.

What is claimed is:

1. A foot assembly for a power hand tool of the type that has a housing with a greater lengthwise dimension than its width, the foot assembly comprising:
    a platform with a bottom planar surface around a substantial part of its outer periphery and a curved arch portion, said arch portion having at least one opening for use in attaching said platform to the housing;
    a swivel lock at least partially within said arch portion, said swivel lock having a pair of sidewalls, at least one opening and being moveable in a longitudinal direction relative to the housing;
    a mount passing through said arch portion opening and said swivel lock opening and connected to the tool housing; and,
    a lever pivotally held on said mount, said lever having a cam defined between two lever sidewalls, said cam lever sidewalls configured to be pivotally held within said swivel lock pair of sidewalls, said lever configured to lock said platform and said swivel lock in place when said lever is pivoted in a direction towards said platform to cause said cam to engage said swivel lock to thereby sandwich said swivel lock and said arch portion in place between the tool housing and said lever cam.

2. A foot assembly as defined by claim 1 wherein said arch portion at least one opening is configured for providing forward and rearward longitudinal travel of said arch portion, and for tilting of said arch portion and said platform in either direction to at least a 45° angle.

3. A foot assembly as defined by claim 1 wherein said swivel lock has a pair of sidewalls with a rear edge, a slot defined in each of said pair of sidewalls, wherein said lever has a pair of raised ridges, said swivel lock movable between at least a first position wherein each of said raised ridges are received in one of said sidewall slots and a second position wherein said raised ridges abut said sidewall rear edge.

4. A foot assembly as defined by claim 1 wherein said mount includes a threaded bolt and a substantially cylindrical removable yoke having a bore therethrough for receiving said threaded bolt, said lever mounted about the circumference of said substantially cylindrical removable yoke, and wherein said cam is configured to be spaced from said swivel lock by a distance when said lever is in an unlocked position and to lockingly engage said swivel lock when said lever is in a locked position.

5. A foot assembly as defined by claim 1 wherein said swivel lock has at least one arm configured to engage said arched portion, said arm extending in a direction towards the tool housing that is substantially parallel with the direction of said mount.

6. A foot assembly as defined by claim 1 wherein said swivel lock opening is generally slot-shaped in the longitudinal direction of the tool whereby said swivel lock may travel in the longitudinal direction relative to said mount.

7. A foot assembly as defined by claim 1 wherein said arch portion at least one opening includes first and second openings, said mount passing through said first opening and said swivel lock having at least one arm that engages said second opening.

8. A tiltable portable jigsaw foot for a jigsaw of the type that has a housing with a lengthwise direction greater than its width and a reciprocating blade, the foot assembly comprising:

a platform movable along the longitudinal direction of the jigsaw and tiltable relative to the housing, said platform having a generally curved arch portion, first and second openings extending through said arch portion;

a swivel lock at least partially within said arch portion and having an opening therethrough, said swivel lock having a rear edge and a restraining arm engaging said arch portion upper wall second opening;

a threaded bolt passing through said swivel lock opening and through said arch portion first opening, said threaded bolt removably attached to the jigsaw;

a yoke removably held on said threaded bolt; and, a lever pivotally held on said yoke and having an eccentric cam, said lever operable to cause said eccentric cam to hold said swivel lock in place, said lever having at least one locking formation for abutting said swivel lock rear edge.

9. A portable electric jigsaw comprising:

a housing containing a motor;

a reciprocating blade linked to said motor; and, a foot assembly connected to said housing and having:

a platform with a bottom planar surface around a substantial part of its outer periphery and a curved arch portion, said arch portion having a first opening configured to provide longitudinal travel of said arch portion and said platform relative to said housing and tilting of said platform relative to said housing, said arch portion having a second opening;

a swivel lock at least partially within said arch portion, said swivel lock having a slot, said swivel lock having a locking arm engaging said arch portion second opening;

a mount passing through said arch portion first opening and said swivel lock slot and adjustably connected to the tool housing; and a lever pivotally held on said mount, said lever configured to lock said platform in place.

10. A foot assembly for a power hand tool of the type that has a housing with a greater lengthwise dimension than its width, the foot assembly comprising:

a platform with a bottom planar surface around a substantial part of its outer periphery and a curved arch portion, said arch portion having a front edge and at least one opening for use in attaching said platform to the housing;

a swivel lock at least partially within said arch portion, said swivel lock having at least one opening and having a restraining arm configured to engage said arch portion front edge;

a mount passing through said arch portion opening and said swivel lock opening and connected to the tool housing; and, a lever pivotally held on said mount, said lever configured to lock said platform in place.

11. A foot assembly for a power hand tool of the type that has a housing with a greater lengthwise dimension than its width, the foot assembly comprising:

a platform with a bottom planar surface around a substantial part of its outer periphery and a curved arch portion with a generally semi-cylindrical shape and first and second openings, said first opening having a transverse cross portion and a longitudinal stem portion, said second opening comprising a slot extending along a portion of the perimeter of said arched portion;

a swivel lock at least partially within said arch portion, said swivel lock having at least one opening and having a restraining arm engaging said slot;

a mount passing through said arch portion first opening and said swivel lock opening and connected to the tool housing; and, a lever pivotally held on said mount, said lever configured to lock said platform in place.

12. A foot assembly as defined by claim 11 wherein said platform is configured to travel longitudinally relative to the housing and is also rotatable about a longitudinal axis when said lever is in an unlocked position.

13. A foot assembly as defined by claim 11 wherein said swivel lock and said lever are substantially contained in said platform arch portion above said platform bottom planar surface when said lever is in a locked position.

14. A foot assembly for a power hand tool of the type that has a housing with a greater lengthwise dimension than its width, the foot assembly comprising:

a platform with a bottom planar surface around a substantial part of its outer periphery and a curved arch portion, said arch portion having at least one opening for use in attaching said platform to the housing;

a swivel lock at least partially within said arch portion, said swivel lock having at least one opening and a rear edge;

a mount passing through said arch portion opening and said swivel lock opening and connected to the tool housing; and, a lever pivotally held on said mount and having at least one locking formation engageable with said swivel lock rear edge to resist longitudinal movement of said swivel lock when said lever is in a locked position, said lever configured to lock said platform in place.

* * * * *